United States Patent
Ballu

(10) Patent No.: US 9,090,140 B2
(45) Date of Patent: Jul. 28, 2015

(54) PENDULUM SUSPENSION DEVICE OF A SPRAY RAMP FOR AN AGRICULTURAL MACHINE

(71) Applicant: EXEL INDUSTRIES, Epernay (FR)

(72) Inventor: Patrick Jean Marie Ballu, Reims (FR)

(73) Assignee: EXEL INDUSTRIES (FR)

( * ) Notice: Subject to any disclaimer, the term of this patent is extended or adjusted under 35 U.S.C. 154(b) by 0 days.

(21) Appl. No.: 13/933,428

(22) Filed: Jul. 2, 2013

(65) Prior Publication Data

US 2014/0015212 A1 Jan. 16, 2014

(30) Foreign Application Priority Data

Jul. 12, 2012 (FR) ...................................... 12 56705

(51) Int. Cl.
*A01M 7/00* (2006.01)
*B60G 9/02* (2006.01)

(52) U.S. Cl.
CPC ............. *B60G 9/022* (2013.01); *A01M 7/0053* (2013.01)

(58) Field of Classification Search
CPC .. A01M 7/0053; A01M 7/0057; B60G 9/022; B60G 9/025
USPC ............ 280/124.111, 124.112; 239/159, 166, 239/167
See application file for complete search history.

(56) References Cited

U.S. PATENT DOCUMENTS

| | | | | | |
|---|---|---|---|---|---|
| 3,094,796 | A | * | 6/1963 | Atchley | 172/4.5 |
| 4,394,968 | A | * | 7/1983 | Tyler | 239/167 |
| 4,561,591 | A | * | 12/1985 | Ballu | 239/159 |
| 6,010,080 | A | * | 1/2000 | Marchand et al. | 239/172 |
| 7,818,953 | B2 | * | 10/2010 | Pellenc et al. | 56/330 |

* cited by examiner

*Primary Examiner* — Ruth Ilan
*Assistant Examiner* — Timothy Wilhelm
(74) *Attorney, Agent, or Firm* — Cantor Colburn LLP

(57) ABSTRACT

A pendulum suspension device of a spray ramp, including:

a fixed frame intended to be borne by an agricultural machine;

a mobile frame intended to bear one or several spray ramps, at least one pendulum suspension connecting rod of the mobile frame on the fixed frame, and at least one actuation cylinder for varying the tilt of the mobile frame relatively to the fixed frame, remarkable in that the actuation cylinder is interposed between the fixed frame, and the connecting rod, and in that means are provided for displacing, relatively to the mobile frame, the attachment point of the connecting rod under the action of the actuation cylinder, so as to re-center the mobile frame relatively to the fixed frame when the attachment point is displaced.

6 Claims, 5 Drawing Sheets

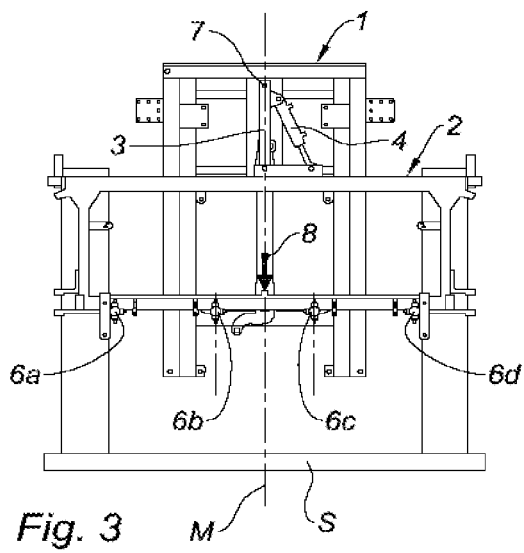
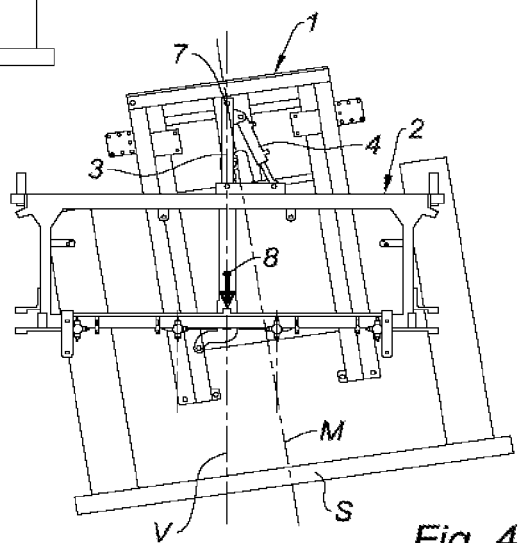
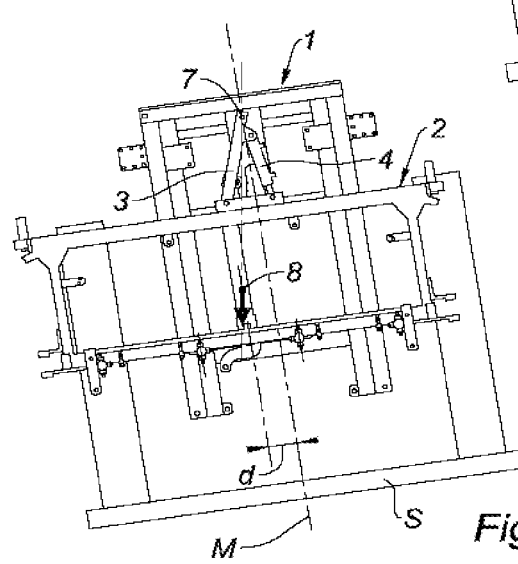

PENDULUM SUSPENSION DEVICE OF A SPRAY RAMP FOR AN AGRICULTURAL MACHINE

TECHNICAL FIELD

The present invention relates to a pendulum suspension device of a spray ramp, and to an agricultural machine equipped with such a device.

BACKGROUND

A pendulum suspension device of a spray ramp on an agricultural machine is known from the prior art, typically comprising, as this is visible in FIGS. 1 to 3, a fixed frame 1 intended to be borne by an agricultural machine, a mobile frame 2 pendularly connected through a suspension connecting rod 3 to the chassis 1, and a correction actuation cylinder 4 interposed between the mobile frame 2 and the fixed frame 1.

The mobile frame 2 is intended to support spray ramps, one portion 5 of which supporting spray nozzles 6a, 6b, 6d is visible in the figures appended herein.

When the machine circulates on flat ground (see FIG. 3), the mobile frame 2 is parallel to the ground and therefore substantially perpendicular to the fixed frame 1.

When the machine circulates on sloping ground (see FIG. 4), the suspension point 7 and the center of gravity 8 of the mobile frame 2 tend to remain aligned on the vertical V, which in other words means that the spray ramp tends to keep a horizontal position.

The result of this is a relative tilt of the mobile frame 2 relatively to the fixed frame 1 and relatively to the ground S.

As it is sought to obtain homogeneous spraying, it is necessary to establish parallelism between the mobile frame 2, and therefore the spray ramps, and the ground S, so as to achieve the configuration illustrated in FIG. 5.

This configuration is obtained by acting on the actuation cylinder 4.

During this actuation, because the center of gravity 8 and the suspension point 7 of the mobile frame 2 tend to remain aligned along the vertical V, this center of gravity 8 moves away by a certain distance D from the middle line M of the fixed frame 1.

The result is therefore a lateral shift of the mobile frame 2, and of the associated spray ramps, relatively to this middle line M.

This is notably damaging since the result may be gaps or doubles in spraying during the following passages of the agricultural machine, it being noted that successive passages are preferably separated by a constant distance.

BRIEF SUMMARY

The invention seeks a remedy to these drawbacks.

The invention provides a pendulum suspension device of a spray ramp, comprising:
- a fixed frame intended to be borne by an agricultural machine,
- a mobile frame intended to bear one or several spray ramps,
- at least one pendulum suspension connecting rod of said mobile frame on said fixed frame, and
- at least one actuation cylinder for varying the tilt of said mobile frame relatively to said fixed frame, remarkable in that said actuation cylinder is interposed between said fixed frame and said connecting rod, and in that means are provided for displacing, relatively to said mobile frame, the attachment point of said connecting rod under the action of said actuation cylinder, so as to re-center said mobile frame relatively to the fixed frame when said attachment point is displaced.

By these features, a device is obtained with which sideway displacements of the mobile frame, inherent to its change in tilt relatively to the fixed frame may be compensated: in this way, the problems of spraying gaps or doubles of the prior art are suppressed.

According to other optional features of this device of the prior art:
- said displacement means comprise a rack secured to said mobile frame, at least one first pinion rotatably mounted on the attachment point of said connecting rod and engaged with this rack, and means for setting this pinion into rotation under the action of said actuation cylinder;
- said rotating means comprising at least one second pinion interdependent in rotation with said first pinion, engaged with a chain connected at both of its ends to said fixed frame;
- elastic means may be interposed between the ends of said chain and said fixed frame;
- elastic and/or damping means may be interposed between said fixed frame and said mobile frame.

The present invention also relates to an agricultural spraying machine equipped with such a suspension device.

BRIEF DESCRIPTION OF THE DRAWINGS

Other features and advantages of the present invention will become apparent in the description which follows, and upon examining the figures appended herein, wherein:

FIGS. 3 to 5 are rear views of the device of the prior art, in different operating configurations.

Figure 1:
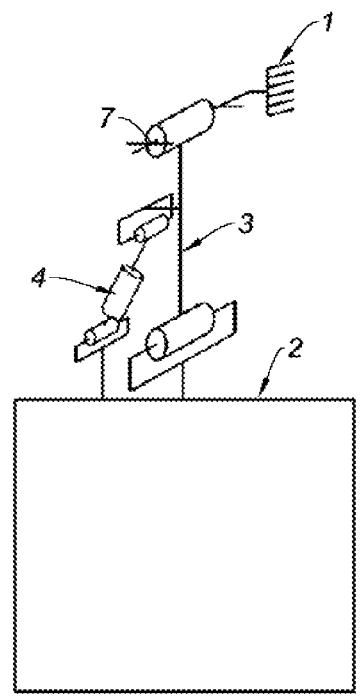
FIG. 1 is a schematic view of a suspension device of the prior art, described in the preamble of the present description.
Figure 2:
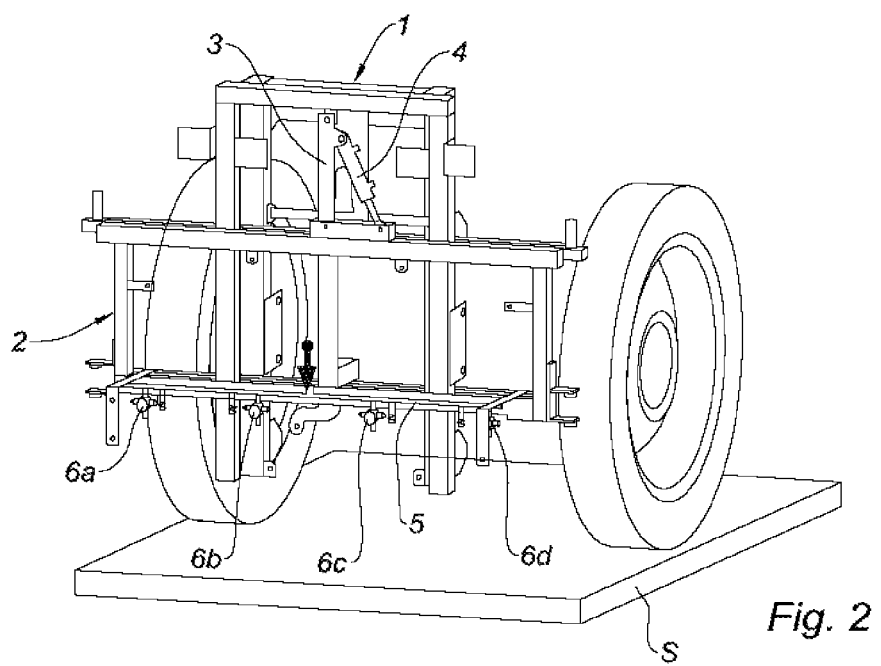
FIG. 2 is a perspective view of this device of the prior art.
Figure 6:
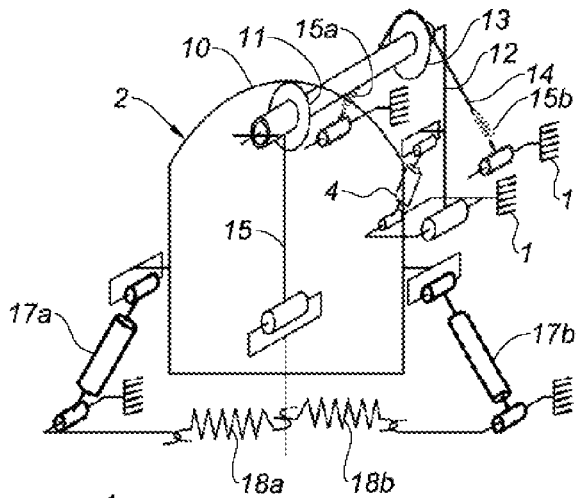
FIG. 6 is a schematic view of a suspension device according to the present invention.
Figure 7:
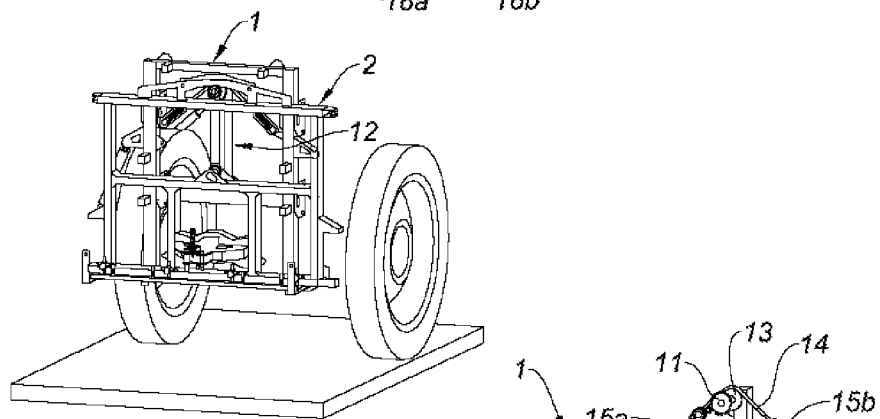
FIGS. 7 and 8 are perspective views, respectively assembled and exploded views, of the suspension device according to the invention.
Figure 8:
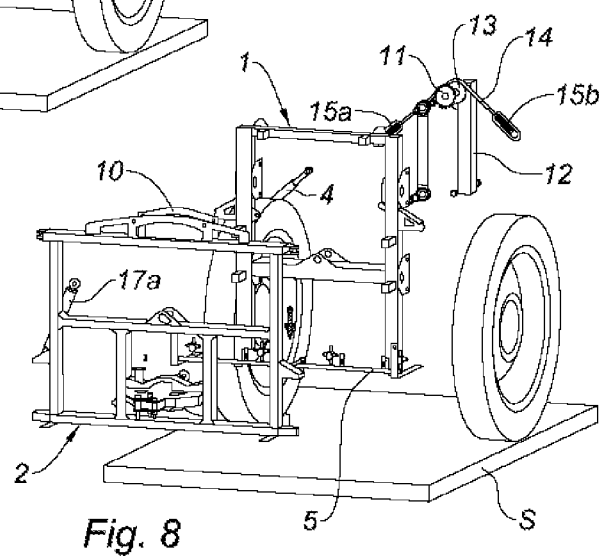

In the whole of these figures, identical or similar references designate identical or similar members or member assemblies.

DETAILED DESCRIPTION

Reference is now made to FIGS. 6 to 9, wherein it may be seen that the mobile frame 2 includes in its upper portion a rack 10 which meshes with a first pinion 11 rotatably mounted on a connecting rod 12 itself pivotally mounted on the fixed frame 1, an actuation cylinder 4 being interposed between this connecting rod 12 and the fixed frame 1.

A second pinion 13 interdependent in rotation with the first pinion 11 is engaged with a chain 14, both ends of which may be connected to the fixed frame 1 via respective springs 15a and 15b.

Optionally, a second connecting rod 15 may be interposed between the connecting rod 12 and the mobile frame 2.

Also optionally, damping 17a, 17b and elastic 18a, 18b means may be interposed between the mobile frame 2 and the fixed frame 1.

The operating mode and the advantages of this device will be described in the following.

Figure 9:
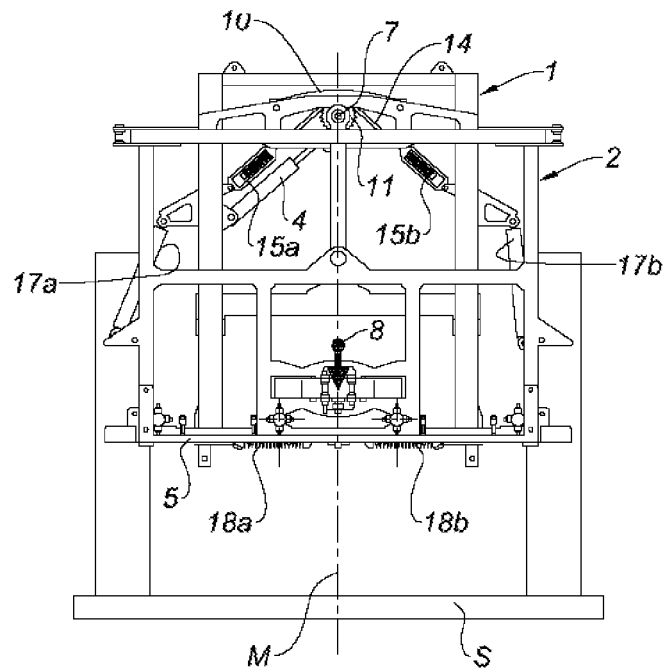
FIGS. 9 to 12 illustrate the device according to the invention for different ground inclinations.
Figure 10:
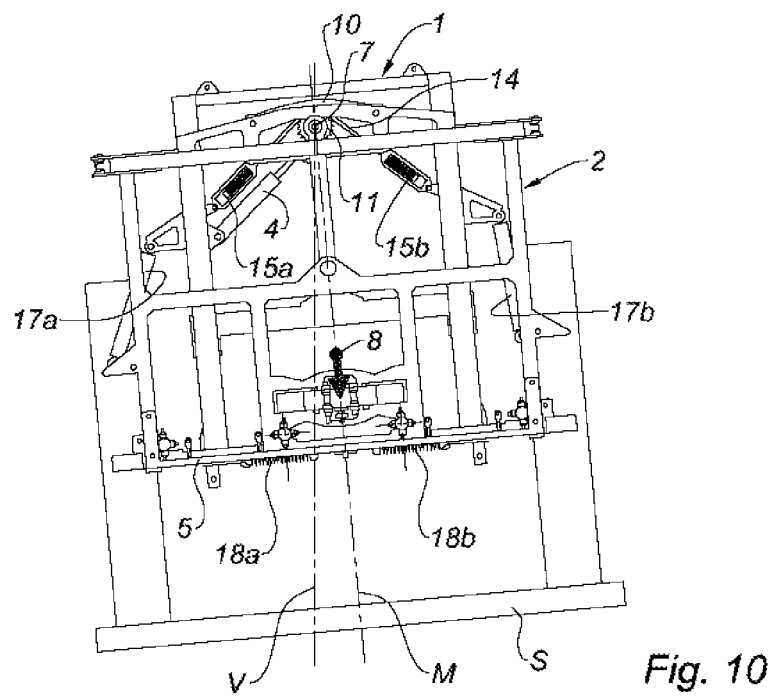

As this is visible in FIG. 9, when the agricultural machine circulates on flat ground, the mobile frame 2 is substantially parallel to the ground S and the center of gravity 8 of this mobile frame is found on the middle line M of the machine. When the machine circulates on a ground S with a small slope, as this is visible in FIG. 10, the configuration of FIG. 9 is retained, because of the resistance opposed by the elastic means 18a, 18b.

The result of this is that the center of gravity 8 of the mobile frame 2 slightly moves away from the vertical V but remains in the middle line M of the agricultural machine.

When the machine circulates on a ground S having a greater slope (see FIG. 11), the center of gravity 8 of the mobile frame 2 tends to join up with the vertical V, so as to reach a configuration substantially similar to the one of FIG. 4 described earlier.

With the device according to the invention, when it is desired to re-establish the parallelism of the mobile frame 2 with the ground S, the actuation cylinder 4 is actuated.

Figure 11:
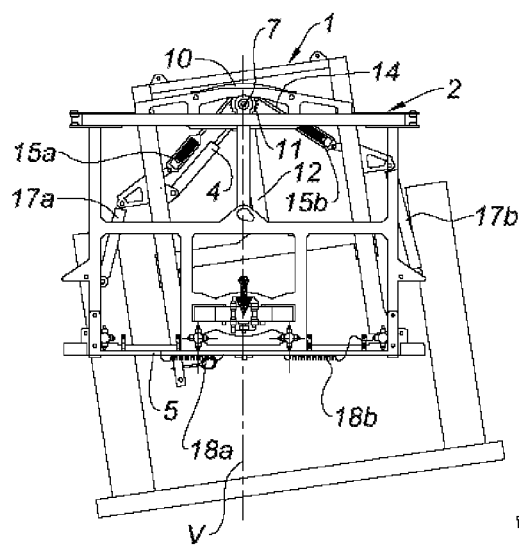

More specifically, starting from the configuration visible in FIG. 11, the length of the actuation cylinder 4 is increased, which, because of the engagement of the second pinion 13 with the chain 14, has the effect of causing rotation of this second pinion in the anti-clockwise direction, and thus causing rotation of the first pinion 11 in the same direction.

Figure 12:
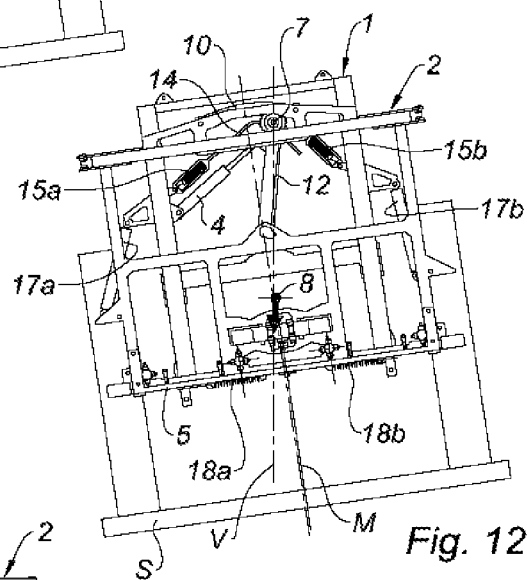

The result of this is that the suspension point 7 of the mobile frame 2 relatively to the connecting rod 12 is moved towards the right of this mobile frame, as this is visible in FIG. 12.

Such a displacement has the effect of re-establishing parallelism of the mobile frame 2 relatively to the ground, because the center of gravity 8 of the mobile frame 2 tends to remain at the vertical of the suspension point 7.

But also, because of the extension of the actuation cylinder 4, causing pivoting of the connecting rod 12 towards the right of FIG. 12, the suspension point 7 is shifted towards the right of the fixed frame 1, allowing the center of gravity 8 to be brought back onto the middle line M of the agricultural machine.

It is therefore understood according to the foregoing, that the device according to the invention, gives the possibility in a very simple way of re-centering the mobile frame 2 and therefore the associated spray ramp, relatively to the fixed frame 1 after having moved the suspension point of the mobile frame 2 in order to maintain the parallelism of this mobile frame relatively to the ground S.

In this way, all the shifting problems seen in the prior art are suppressed and it is notably possible to ensure optimum overlapping of the sprayed areas during successive passages of the agricultural machine.

Figure 13:
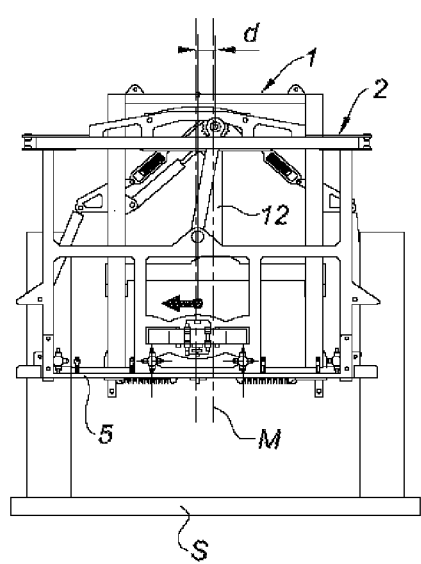
FIG. 13 illustrates the device according to the invention in a bend configuration.

Moreover it will be noted, as this is visible in FIG. 13, that the tilt of the mobile frame 2 relatively to the fixed frame 1 during U-turns of the agricultural machine, due to the centrifugal force applied to the (mobile frame 2+spray ramp 5) assembly, may be reduced by means of a device according to the invention, thereby limiting the contact between the ground and the ramp.

Indeed, during a U-turn of the agricultural machine, the connecting rod 12 is brought back into its middle position, visible in FIG. 4, and blocked in this position by the actuation cylinder 4.

However, the pinions 11, 13 remain free to rotate relatively to this connecting rod.

The result of this is that a centrifugal force tending to impart a shift d to the mobile frame 2 relatively to the middle line M of the machine, has the effect of causing rotation of both pinions 11, 13 under the action of the rack 10, which rotation is immediately damped by the springs 15a, 15b.

Therefore, it is understood that the pinions 11, 13 allow some flexibility of the connection of the mobile frame 2 with respect to the connecting rod 12, which flexibility has the simple effect of generating a shift D of the center of gravity 8 of the mobile frame 2 relatively to the middle line M of the machine, except for all substantial variations in the tilt of the mobile frame 2 relatively to the fixed frame 1.

Of course, the present invention is by no means limited to the described and illustrated embodiment, provided as simple examples.

The invention claimed is:

1. A pendulum suspension device of a spray ramp, comprising:
    a fixed frame intended to be borne by an agricultural machine,
    a mobile frame intended to bear one or several spray ramps,
    at least one pendulum suspension connecting rod of said mobile frame pivotally mounted on said fixed frame, and
    at least one actuation cylinder in order to vary the tilt of said mobile frame relatively to said fixed frame,
    wherein said actuation cylinder is interposed between said fixed frame and said connecting rod, and wherein means are provided for displacing relatively to said mobile frame an attachment point of said connecting rod under the action of said actuation cylinder, so as to re-center said mobile frame relatively to the fixed frame when said attachment point is displaced.

2. The device according to claim 1, wherein said displacement means comprise a rack interdependent with said mobile frame, at least one first pinion rotatably mounted on the attachment point of said connecting rod and engaged with this rack, and means for setting this pinion into rotation under the action of said actuation cylinder.

3. The device according to claim 2, wherein said rotation means comprise at least one second pinion interdependent in rotation with said first pinion, engaged with a chain connected at both of its ends to the fixed frame.

4. The device according to claim 3, wherein elastic means are interposed between the ends of said chain and said fixed frame.

5. The device according to claim 1, wherein elastic and/or damping means are interposed between said fixed frame and said mobile frame.

6. An agricultural spraying machine equipped with a device according to claim 1.

* * * * *